United States Patent [19]

Stengel, III

[11] Patent Number: 5,297,683
[45] Date of Patent: Mar. 29, 1994

[54] PROCESS AND APPARATUS FOR PROCESSING RESINS

[75] Inventor: Alfred Stengel, III, Richmond, Va.

[73] Assignee: AKS, Inc.

[21] Appl. No.: 864,651

[22] Filed: Apr. 7, 1992

[51] Int. Cl.$^5$ .............................................. B03B 7/00
[52] U.S. Cl. ..................................... 209/17; 209/271; 209/487
[58] Field of Search .................. 209/17, 158, 159, 315, 209/380, 457, 270, 271

[56] References Cited

U.S. PATENT DOCUMENTS

| | | | |
|---|---|---|---|
| 484,933 | 10/1892 | Hoyt | 209/271 |
| 753,440 | 3/1904 | Spencer | 209/271 |
| 2,857,053 | 10/1958 | Schmiedel | 209/270 |
| 3,794,165 | 2/1974 | Riesbeck et al. | 209/325 |
| 4,096,911 | 6/1978 | Geske | 166/234 |
| 4,120,786 | 10/1978 | Petersen et al. | 209/454 |
| 4,276,265 | 6/1981 | Gillespie | 422/311 |
| 4,511,675 | 4/1985 | Auerswald | 521/26 |
| 4,913,803 | 4/1990 | Earls et al. | 209/17 |
| 5,124,029 | 6/1992 | Fjallstrom et al. | 209/271 |

Primary Examiner—D. Glenn Dayoan
Assistant Examiner—Kenneth Noland
Attorney, Agent, or Firm—Foley & Lardner

[57] ABSTRACT

A resin processing system in which a mixture of resins, preferably a mixture of anionic and cationic resins, is separated by a laminar or essentially laminar flowing fluid through a separator module, wherein the anionic particles are removed from the top of the module, and the cationic particles are removed from the bottom of the module. The separated particles can be reused, with or without regeneration of the resins, or can be discarded. Preferably, the mixed resin is cleaned by use of one or more vibrating screen and rotating sprayers which spray water prior to introduction into the separation module. Furthermore, the cleaned mixture can be used without separation. The resin processing system can be used to clean and separate resins which have been used, or to condition resins which have not been used, in water purification processes.

21 Claims, 4 Drawing Sheets

PROCESS AND APPARATUS FOR PROCESSING RESINS

BACKGROUND OF THE INVENTION

1. Field of the Invention

This invention relates to a method and apparatus for treating and processing a mixture of resins. More particularly, the invention relates to a new and improved method and apparatus for separating a mixture of ion exchange resins. The invention also relates to a new and improved method for cleaning a mixture of resins, particularly a mixture of ion exchange resins.

2. Description of Related Art

Ion exchange resins comprising a mixture of cationic and anionic resins are used in the production of high purity water. These resins are able to remove ionic impurities from water by a mechanism of selective ion exchange on a large number of active sites contained in the matrix of the resin. This process continues until such time as the active sites have been saturated with ionic impurities from the treated water. Commonly, at that time, the ion exchange resins are regenerated with highly concentrated ionic solutions to restore their capacity to remove the ionic impurities from water. It is generally preferred to separate the anion resins from the cation resins, before regeneration, so as to properly regenerate each resin.

Techniques to separate various types of synthetic ion exchange resins from one another have been used for decades around the world. The principal method of separating a composition of ion exchange resins which contains mixed cation and anion resins is via controlled hydraulic upflow in a vertical, cylindrical vessel. This technique is useful because the cation and anion resins are designed and manufactured with two different densities, thus allowing the cation resin to settle while the anion resin is lifted in a controlled upflow of water.

Mechanical engineering principles of fluid dynamics are used to affect the separation of the anion from the cation resins. Particle size differential in conjunction with density differences of the resin particles is used to optimize the degree of separation. An example to illustrate these properties, in which a resin mixture to be separated contains particles A and B, is as follows:

| Cation Particle "A" | diameter of 750 microns<br>density of 1.23 g/ml<br>terminal settling velocity of 0.09 ft/sec |
|---|---|
| Anion Particle "B" | diameter of 600 microns<br>density of 1.08 g/ml<br>terminal settling velocity of 0.03 ft/sec |

In this example, it is clear than an upflow velocity of a fluid, such as water in a column, great enough to overcome the terminal settling velocity of Particle "B", but not great enough to overcome the terminal settling velocity of particle "A" results in a separation of the two particles, as particle "B" is carried up the column, and particle "A" falls toward the bottom of the column.

Although the use of separation processes involving upflow of water in a vertical cylindrical vessel has gained commercial acceptance, operating experience over the years has demonstrated that there are numerous deficiencies in the apparatus and processes used resulting in undesired effects, such as incomplete separation of the resins. Particularly, conventionally designed vertical, cylindrical vessels exhibit uneven hydraulic distribution and various dead-zones, (that is areas where turbulence of flow is insufficient to transport entrained particles) which adversely affect separation. These factors, along with the method of removing the resins from the separation vessels, result in varying degrees of material cross contamination, or unwanted mixing of particles, which results in incomplete separation of the anion and cation resins.

Conventional methods of separation further require the addition of large amounts of external water and require permanent installation at the site where the resins are to be processed. These factors are undesirable because they lead to increased costs and the production of a greater amount of waste water when external water is used.

U.S. Pat. No. 4,913,803 to Earls et al. is an example of a conventional particle separation apparatus and process. The process involves using a separation tube which has orifices so as to induce turbulent flow in the fluid flowing through the tube. The use of such orifices results in potential dead-zones in the separator and hence reduces the effectiveness of particle separation.

U.S. Pat. No. 4,120,786 to Petersen et al., is a further example of a known separation system which uses an upflow water stream. The separating column contains a pH monitor to determine the interface between the anion and cation resins and includes stacked baffles within the separation region. Such baffles can create dead-zones within the column which reduce the degree of separation of the cation from the anion resin particles.

SUMMARY OF THE INVENTION

It is therefore an object of the present invention to provide an apparatus and a process for separating a mixture of resins, preferably a mixture of anionic and cationic resins, which results in excellent separation as compared to the separation obtained in conventional separators.

It is a further an object of the invention to provide a method for cleaning resins, preferably a mixture of resins, particularly a mixture of anionic and cationic resins, either prior to or after the mixture of resins has been used in water treatment, wherein the cleaned resins can be used without separation, or can be subjected to separation and optional regeneration.

It is a further object of the invention to provide an apparatus for treating resins which is mobile and can be carried from site to site without permanent installation.

It is an additional object of the present invention to propose a continuous process which uses no external water for cleaning and/or classifying and/or separating a mixture of resins.

In accomplishing the foregoing objectives there has been provided, in accordance with one aspect of the invention, a method of separating a mixture of resins, comprising a first and second type of resins which have different settling velocities and different densities, from each other comprising the steps of:

a) introducing said mixture of resins at an entry height into a separator column having an upper and lower region wherein both regions have an outlet, and between said outlets is a separation zone;

b) flowing a carrier fluid upwardly through said column at a velocity less than the settling velocity of the first type of resins and greater than the settling velocity of the second type of resins, wherein said carrier fluid is introduced into said separator column as a fluid having a laminar or essentially laminar flow, and wherein the carrier fluid maintains this laminar or essentially laminar flow throughout the separation zone of said separator column; and c) removing said second type of resins from said upper region and removing said first type of resins from said lower region.

According to another aspect of the invention, there is provided an apparatus for separating a mixture of cation and anion exchange resins comprising:

a) a separator column including a resin entry, a carrier fluid entry, an upper region and a lower region;
b) means for introducing said resin mixture at said resin entry into said separator column;
c) an outlet for removing separated cation resin at said lower region of said separator column;
d) an outlet for removing separated anion resin at said upper region of said separator column, and
e) means for providing carrier fluid with laminar or essentially laminar flow upon entry into the separator column, such that said carrier fluid maintains said laminar or essentially laminar flow between the cation resin outlet and anion resin outlet of said separator column.

It is also an object of the invention to provide a method of cleaning a mixture of anion and cation resins which comprises the steps of subjecting the resins to pressurized rotating water spraying and using centrifugal force to force the resin mixture across screens which serve to sieve out undesired impurities and smaller resins.

Further features, objects, and advantages of the present invention will be set forth in or will become apparent from the detailed description of preferred embodiments that follows, or may be learned by practice of the invention. The objects and advantages of this invention may be realized and obtained by means of the instrumentalities and combinations particularly pointed out in the appended claims.

DETAILED DESCRIPTION OF THE PREFERRED EMBODIMENTS

Figure 1:
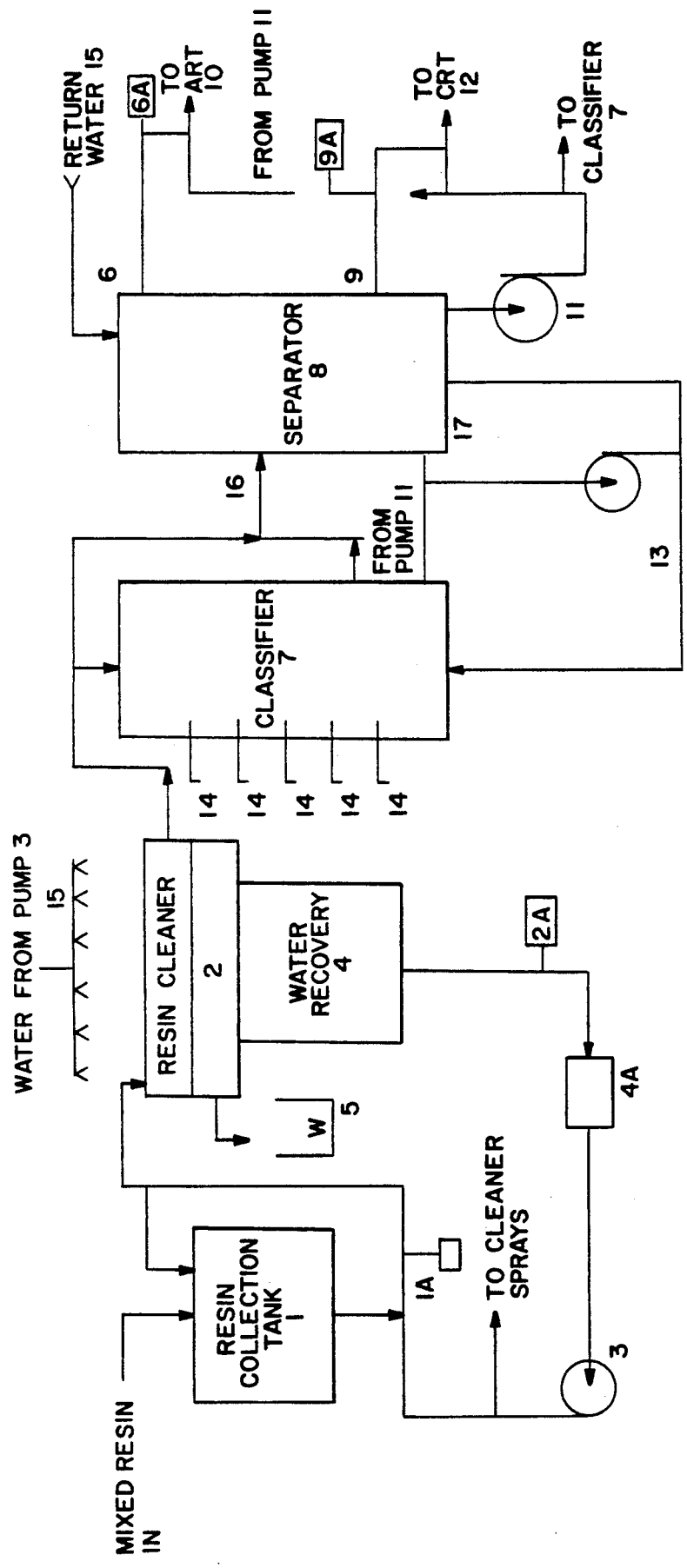
FIG. 1 schematically illustrates a preferred resin processing process and apparatus according to the invention.

A preferred apparatus and process will now be described with reference to FIGS. 1–4. In the Figures, like elements are represented by like reference numbers.

A mixture of cation and anion resins are collected as a slurry in tank 1. The mixture of resins is recirculated through the tank, so as to adequately mix the resins, and a sample is obtained by sample device 1A for analysis. Sampling and analysis quantify physical and chemical properties of the mixture to aid in specific selection of subsequent parameters in the treatment process. For example, a mixture of resins having a small amount of intermixed insoluble material can be cleaned in resin cleaner 2 at a higher flow rate.

The mixed resin slurry is sluiced to cleaner 2 using pump 3 and water from tank 4. Pressurized water from pump 3 is sprayed in the cleaner 2 from sprayers 15 to assist resin cleaning.

The water used in cleaner 2 is recovered in tank 4 for reuse noted above. This water is sampled by sample device 2A to determine fine suspended solids content. At a preselected value of solids content, the water is processed for solids removal using an inline filter 4A. Resin fines (undersized and/or broken resin beads) and corrosion products (such as iron oxide) removed in the cleaner 2, are collected for disposal at tank 5.

The cleaned resins are then transferred to classifier tank 7, which operates to remove some of the resin so that the desired mixture can be obtained for separation.

This classification process step is performed by fluidizing the resins using water from pump 13, settling the resins after fluidizing and then removing selected segments of the resin population at various elevations 14 in the tank. The extraction of selected segments allows for more efficient subsequent separation. Cleaned resin can be directed to separator column 8 without classification if desired.

The classified resin mixture passes into the top of separator column 8 at resin entry 16, wherein water flowing from pump 13 is introduced at carrier fluid entry 17, in a controlled countercurrent laminar or essentially laminar environment through the separator 8 so as to effect separation of the resin particles. The separated anion resins exit the top of the separator column at anion outlet 6, and the cation resins exit the bottom of the separator column 8 at cation outlet 9.

The removed anion resins are sluiced to an anion regeneration tank (ART) 10 using water from the separator column 8 and pump 11. The anion resins are sampled by sample device 6A to determine the quality of separation.

The removed cation resins are sluiced to a cation regeneration tank (CRT) 12 using water from the separator and pump 11. A sample of the cation resins is obtained by sample device 9A to determine the quality of separation.

The sluice waters for the transport of separated anion and cation resins are recycled for reuse in the separator assembly and introduced in the separator column 8 at 15. Pump 13 recycles water used in classifier 7 and separator column 8, back to the classifier and/or the separator.

The cleaning and separation process is a continuous one, with resin continually being fed through the system, and the water being reused, without the necessity of adding additional water. The water is generally replaced when soluble or insoluble impurities removed in the process have reached a predetermined value in the water.

Figure 2:
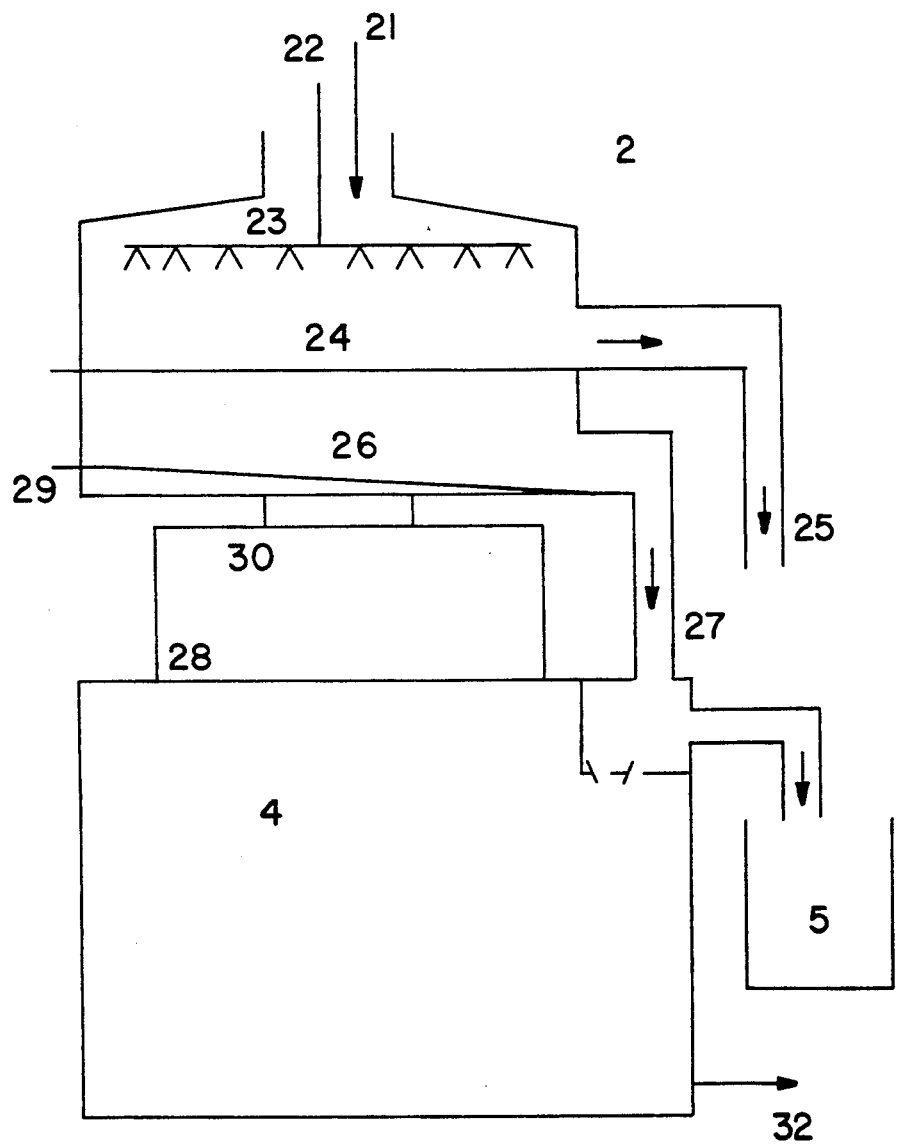
FIG. 2 schematically illustrates a preferred cleaning apparatus of the present invention.

The resin cleaner 2 and a process for cleaning a mixture of resins is now described with reference to FIG. 2. A mixed ion exchange resin slurry is introduced to the top section of the cleaner assembly at 21. Movement of vibrating screen assembly 29 is provided by driver 28 to lift and throw the resin beads across screen 24. Screen selection is based on the size of the smallest resin beads which are desired to be retained. The screen assembly is supported by assembly suspension 30.

Overhead sprays 23 spray water from water supply 22 to clean the resin while it is on the screen in the top section of the cleaner assembly. Spray water also serves to wash insoluble materials and small or fragmented resin beads to the lower section 26 of the cleaner assembly.

Cleaned resins pass to discharge point 25 and to other equipment for subsequent treatment, use or disposal. Waste materials and water pass through the screen 24 to discharge point 27 for collection in recovery tank 4 or waste collector 5. The waste is disposed of, and the water is recycled at tank outlet 32 and supplied to pump 3 in FIG. 1.

Figure 3:
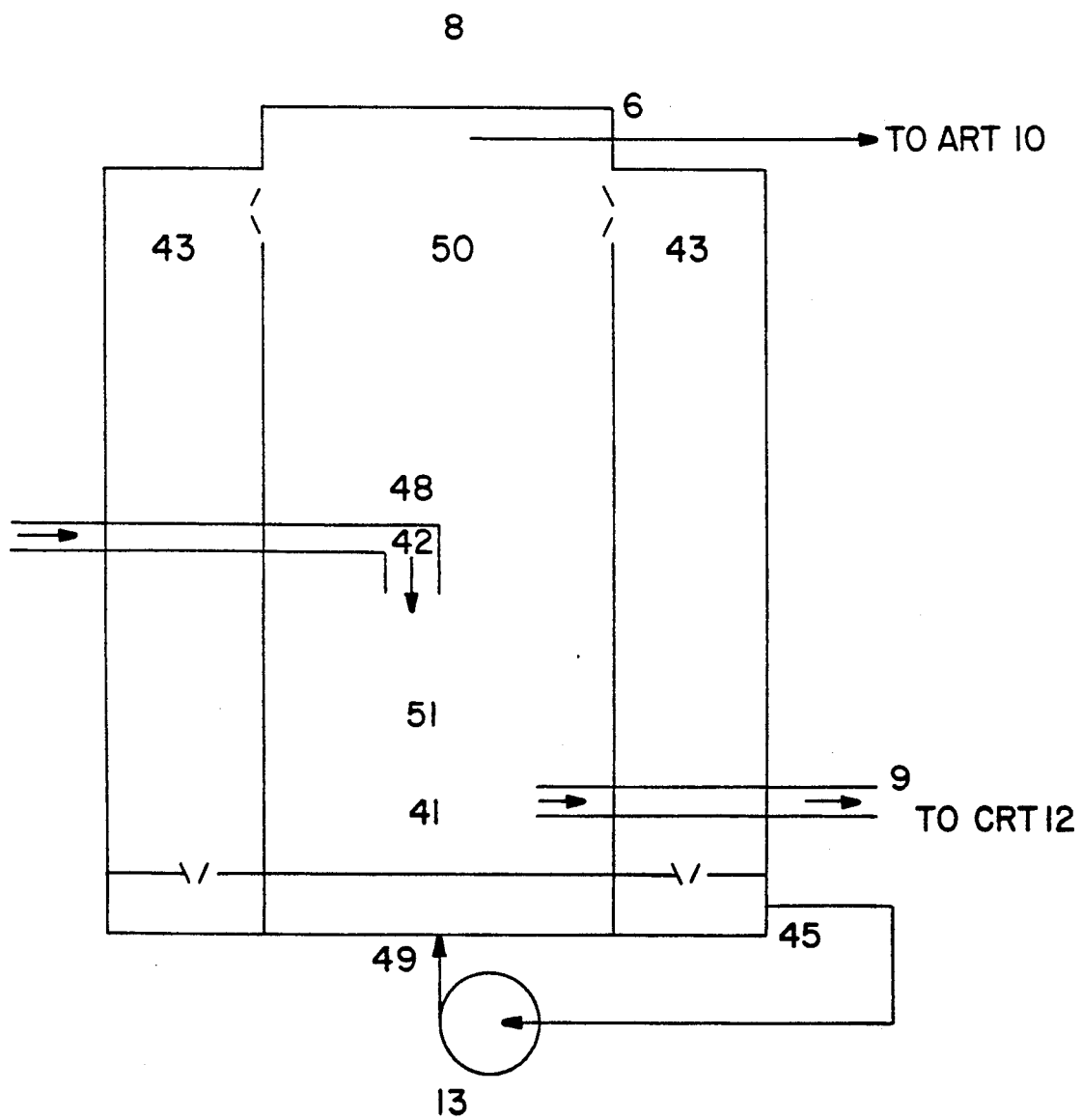
FIG. 3 schematically illustrates a preferred separator module of the present invention.

A preferred resin separator is shown in FIG. 3. The separator column 8, includes an upper region 50 and a lower region 51. Cleaned mixed ion exchange resin is introduced to the separator column 8 at resin entry 42. Upflow pump 13 provides water which enters the resin separator at carrier fluid entry 49, for carrying the smaller, less dense anion to resin outlet 6, in upper region 50. The larger, more dense cation resins settle and are removed at cation outlet 9, in lower region 51.

Means is provided for introducing the mixture of resins at the resin entry 42. In a preferred embodiment the resin introducing means includes a pump which pumps the resin in to the separator, such as pump 11 in FIG. 1.

The separation zone 48 in the separator column 8 extends from the cation outlet 9, to the anion outlet 6. Upward hydraulic flow is laminar or essentially laminar throughout the separation zone 48. Laminar flow is defined as having a Reynolds number less than 2000. A further reduction to the fluid velocity supports the desired streamline environment within the separation column's separation zone. By comparison, a fluid having a Reynolds number greater than 4000 is considerd to be turbulent. Accordingly, the phrase laminar or substantially laminar used in the present specification refers to fluid flow having a Reynolds number of less than about 2000. More preferably, the Reynolds number is less than 500, and most preferably it is less than 200.

The separation zone is that volume in the column 8 generally above and below the resin entry 42 elevation. The actual volume or height for the separation zone is dependent upon the total separator column height. The taller the column, the more volume for separation.

Water used in the separator is provided by pump 13, and passes through screen 41 which screens out solid particles, toward the upper section of the separator 8 to collection chambers 43. The collection chambers supply the upflow pump 13 at point 45 with water. Separated resin streams are forwarded to an anion regeneration tank (ART) 10 and cation regeneration tank (CRT) 12 for further conventional processing as needed.

Figure 4:
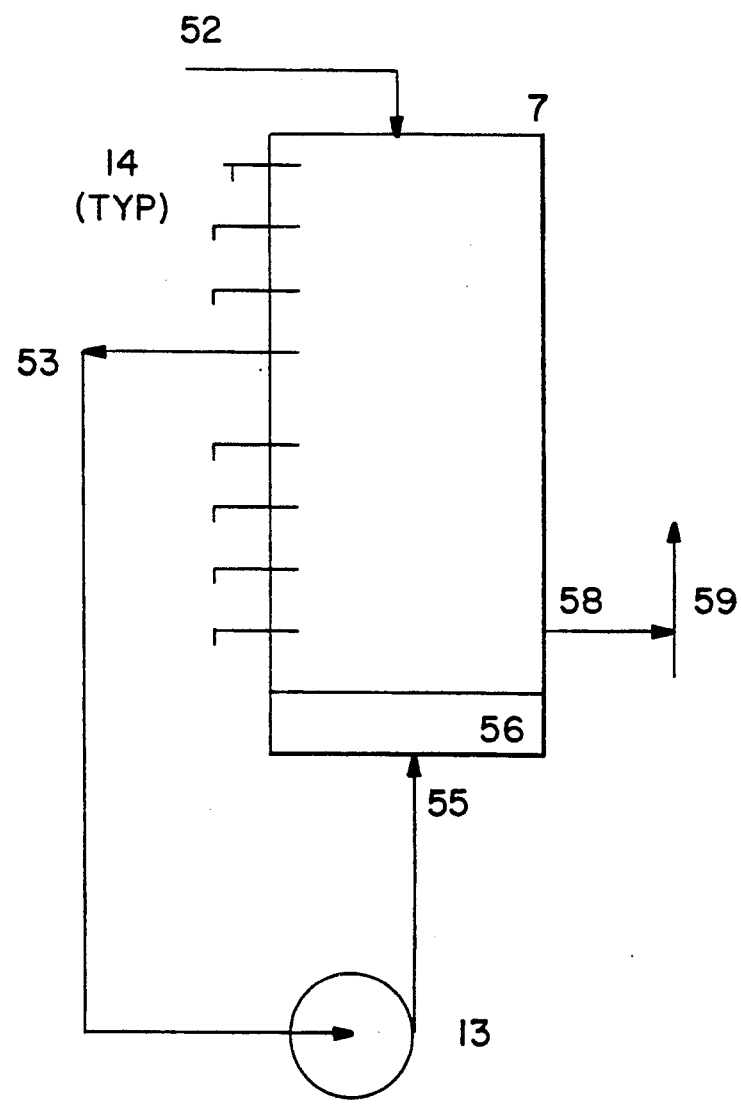
FIG. 4 schematically illustrates a preferred resin classifier of the present invention.

A preferred resin classifier is shown in FIG. 4. Cleaned resin is introduced to classifier tank 7 at 52. The resin is fluidized using water pumped from pump 13 which takes suction from a screen point 53 at mid elevation on the classifier tank 7. Water is introduced to the classifier 7 at point 55. Bottom zone 56 serves to transform water discharged from the pump 13 to a uniform upflow within the classifier tank 7 utilizing conventional distribution devices.

Upon thorough resin fluidization, pump 13 is stopped and resins are allowed to settle. Resins are sampled at one or more tank elevation points 14. Sample analysis determines the physical and chemical suitability for subsequent separation. Selected volumes of the resin are extracted or removed (not shown) from the classifier tank 7 so that a resin mixture remains which will readily separate in separator 8. The resin fraction to be removed is determined by particle size analysis.

Fluidization, settling, and sampling can be repeated as necessary to further classify the resin volume and to extract segments of resin. The final resident volume of resin in the classifier tank 7 is sluiced through a resin separator using eductor 59 which takes suction from point 58 on the classifier tank 7, and the resin is transported to a separator column 8. Motive water is provided by pump 11 shown in FIG. 1.

In a preferred embodiment of the invention, the mixture of resins is cleaned prior to being separated. Cleaning includes the removal of coating adhered to the resin bead surfaces and the removal of insoluble impurities and fines having a size smaller than the size of the resin particles. Selection of the cleaner screen size is based on the size of the smallest resin beads which is desired to be retained. It is preferred to remove the surface coatings of the resin particles prior to separation, so that the resin particles have a determinable density, so that the flow rate of the fluid flowing up through the separator assembly can be adjusted so as to separate the resins efficiently. That is, any surface coating alters the settling velocities of the anionic and cationic particles, thus making separation more unpredictable and hence, more difficult. It is further desired to remove from the resin mixture suspended fine particles, since they serve to interfere with efficient separation in the separator column.

Such cleaning may comprise a pressurized water spray which serves to remove surface coating from the resin particles, and screens which serve to sieve off the undesired particulate impurities or fines. Any other cleaning process can be used which will remove both small fines and undesired surface coating on the resin particles. A commonly occurring surface coating which is desirably removed is iron oxide, which is a corrosion product which often coats the resin particles when the ion exchange resin is used to treat water used in a fossil or nuclear power plant. Resins used in boiling water nuclear reactor power plants are particularly suited for resin cleaning.

A preferred cleaning device uses the principles of centrifugal force combined with the physical forces of a water spray to remove corrosion products and other surface products from the resins. An example of such a device is shown in FIG. 2. The device uses a spray chamber containing sprayers 23 attached to a centrifuge generating motor assembly 28 into which mixed resins are introduced. The coatings on the resin are removed by the hydraulic spray water forces, and the centrifugal motion forces the material slurry to the periphery of the chamber. Removal and transport of foreign material is affected by the centrifugal and physical forces through screens or sieves.

The screen or sieves may be positioned in any fashion so that the desired sieving off of the smaller undesired fines is accomplished. Such screens allow passage of undersized and fragmented resin beads, and impurities, such as iron oxide removed from the resin, through the screens, while prohibiting the desired resin mixture from penetrating whereas the desired resin mixture does not penetrate through the screens. Furthermore, insoluble impurities, such as insoluble corrosion products, pass through the screens. Screens having the desired sieves can be selected depending on which material is desired to be sieved off. It is preferred that the screens be capable of vibration, so as to further enhance the removal of undesired small particles. The use of vibrating screens results in more efficient removal of small particulates than when non-vibrating screens are utilized. Resin cleaning with pressurized water sprays and a single vibrating screen is the preferred cleaning method.

The water sprayed onto the resins serves not only to clean the surfaces of the resins, but also to transport the foreign, small sized materials to the screens and, once passed through the screens, to a waste tank for subsequent disposal. Alternatively, transported foreign or small sized material can be collected with the sprayed water in the water recovery tank. Subsequent inline filtration of the tank contents removes the waste material.

It is especially preferred to use rotating sprayers, rather than fixed sprayers, to spray the water onto the resins. The use of rotating sprayers extends the useful life of the cleaner screen or screens, while performing a highly efficient resin cleaning with less water pressure and flow than required with fixed sprayers. The water is sprayed with sufficient flow and pressure so as to remove the coatings of the resins (as the sprayed water). Water filtered to a predetermined value is preferably used.

The preferred cleaning process results in a particulate mixture of cation and anion resins, wherein the surfaces of the resins have been cleaned, and wherein foreign materials, that is, materials other than the resins themselves, and undesired small resin particles have been removed. If the mixture contains radioactive insoluble materials, the cleaning step also functions to reduce the radiation levels of the mixture due to the removal of insoluble material.

Such a cleaning process is superior to conventional methods of cleaning resins which utilize the principles of ultrasonic fields, air scrubbing, water scrubbing, chemical additions, backwash, or a combination of these.

The cleaning process of the present invention preferably does not separate the resin mixture, but only serves to clean the resins in the mixture. The mixture may then be classified in classifier 7 and/or separated in separator column 8, described hereinafter, or may be reused as a mixture without separation.

A preferred screening device is available from Midwestern Industries, Inc. under the name GYRA-VIB separators. U.S. Pat. No. 3,794,165, which is hereby incorporated by reference, describes the use of vibrating screens to classify different sizes of materials. As an accessory, a spray system capable of spraying high pressurized water can be added to assist with material classification. Although these devices are known per se, they have not before been used or suggested to be used to clean a mixture of resins, which are optionally to be separated, according to the present invention.

In a further embodiment of the invention, if the resin mixture has the potential for containing radioactive material, which is often the case when the ion exchange resins are used to clean water at nuclear power plants, the internal surfaces and geometry of the cylindrical section of the cleaner where cleaning and centrifuging is performed, are designed to minimize the retention of material that might be radioactive. Particularly, the cleaner is designed to not have dead spots where some radioactive material may become entrapped. More particularly, internal sprays are included in the cleaner to flush entrapped materials from the cleaning chamber. Such entrapment of radioactive material is undesirable because it increases exposure to radiation during operation and maintenance of the cleaner.

It is within the scope of the invention to use the cleaned resins without any classifying, separation, and regeneration. Such a cleaned resin mixture having useful ion exchange capacity can be used in any place where it is desired to use a mixture of anion and cation resins, and particularly is useful in nuclear power stations of the boiling water reactor design. The resins to be cleaned according to the invention can be any resin, and are preferably a mixture of resins, most preferably a mixture of cation and anion resins, which have been used to treat water. It is also desirable to clean new ionic exchange resins prior to use, so as to remove undesired impurities in the resins and/or undersized resin beads which may adversely effect the utility of the resins.

The separator module according to the invention is used to separate a mixture of resins. Preferably the resins are first cleaned in a cleaning process as described above, although it is not always necessary for the resins to be cleaned. The resins are preferably classified before separation as described hereinafter, although such classification is not required. Hence, following the optional cleaning process, and the optional classifying process, the mixed resins are introduced into a separator, which generally comprises a column, wherein a precalculated, non-turbulent upflow of fluid is maintained. The separator according to the present invention is different from those previously used, and hence provides advantages over conventional systems.

Particularly, conventional systems, such as described in U.S. Pat. No. 4,913,803, use turbulent flow in the separator column. In stark contrast to these systems, the separating column 8 used in the present process uses an upflow environment which is laminar or essentially laminar throughout the separating region 48 of the column. Laminar flow is selected since the present inventor has found that turbulence is to be avoided in the separation environment, because turbulence will cause disturbance in the separation settling velocities of the resin particles, and hence results in inefficient separation. The use of laminar flow provides significantly improved separation of the ion exchange resins.

The upflow of separating fluid, preferably a fluid comprising water, can be made laminar or essentially laminar in any known manner using any know means to provide the fluid with the desired flow. Particularly, a turbulent fluid can be converted to laminar before introduction into the separator column 8 by providing a natural transition cone resulting from the inlet pipe to the separator column 8 having a smaller cross section than the cross section of the separator column. Other known methods can be used so that the upflow environment remains laminar throughout the separation zone 48 of the separator column 8. A laminar or essentially laminar upflow environment is preferably generated using a low head centrifugal pump of moderate flow capacity and having a discharge pipe velocity sufficient to accommodate the dimension of the separator column 8. The pumping requirements are selected based on the geometric configuration and the hydraulic requirements of the separator column 8 and the materials to be separated. The laminar or essentially laminar flow from the pump is then expanded using a concentric reducing transition section or other conventional distribution means to accommodate the desired separating column chamber cross sectional area. See U.S. Pat. Nos.

4,096,911 and 4,276,265, hereby incorporated by reference, which describe fluid distribution technology, which can be used to produce laminar flow.

To ensure the generation of laminar flow, internal hardware components can be eliminated from the separation chamber. Hence, it is generally not preferred for the separator column to contain baffles, orifices, or flanges. The use of such protrusions usually reduces the usable cross sectional area and the degree of separation due to the creation of dead-zones. Furthermore, these protrusions usually, if not always, introduce turbulence in the flow of the upflowing fluid.

The velocity of the upflow is precalculated so as to effect separation of the resin particles, based on the settling velocities of the particles. The rate of upflow is determined with reference to the settling velocities of the resin particles and the size and design of the column, so as to obtain the most efficient separation, but is independent of the ratio of the resins in the mixture to be separated. Specifically, when a mixture of anionic and cationic resins is to be separated (which is the preferred resin mixture to be separated according to the present invention), the upflow velocity of the separating fluid is selected to be between the settling velocities of the anionic resins and the cationic resins, so that the cationic resins (which have a settling velocity higher than the upflow velocity) pass through the upflow fluid and exit the bottom of the separator. The anionic resins are carried by the upflowing fluid and exit near the top of the separator, because they have a lower settling velocity than the upflow velocity. Therefore, in the controlled countercurrent environment of the separator column, a slurry of mixed resins is divided into two separate streams, one containing the anion resins and the other containing the cation resins.

The upflow fluid, which is also described as the carrier fluid in the present specification, can be any fluid or mixture of fluids which can be introduced with the appropriate velocity to separate the mixture of resins. It is generally preferred to use a fluid which comprises water, since water is the natural environment for the ion exchange resins to be processed. It is also useful to add to the water various chemicals which will accent density differences between the cation and anion resins and thus assist the resin separation process. A preferred assistant is ammonia sulfate which helps to float the anion resin from the cation resin. The use of ammonia sulfate float is described in U.S. Pat. No. 4,511,675.

The resins to be separated with the separating apparatus can be any mixture of resins which have particles having different settling velocities. It is preferred to use a mixture of cation and anion resins, most preferably a mixture of cation and anion resins which have been subjected to the cleaning process described above and the classification described hereafter.

It is also possible, and preferred, to pre-select the sizes of the resins to be separated, so as to obtain the greatest possible separation in the separator column. Such pre-selection or classification preferably occurs after cleaning, if performed, and before use of the upflow fluid in the separator column. This pre-selection or classification is accomplished by fluidizing the mixed resins and extracting segments of the resin inventory at selected elevations in the vertical tank (see FIG. 4). Extraction means are provided to remove selected portions of the resin population for the final separation process. Hydraulic upflow is used to fluidize the resin mixture.

It is within the scope of the present invention to perform the classification step, on cleaned or uncleaned resins and to either separate the classified resin in separator 8, or to use the classified resins without further separation. That is, a mixture of resins, particularly ion-exchange resins, can be subject to the classifying step alone or in connection with cleaning and/or separating.

Once the resins are separated in column 8, the carrier fluid is generally separated from the resin, with the carrier fluid recycled into the process. The resins can then be used for their known purposes. Particularly, the separated anionic and cationic resins can be used as they are or, if desired, regenerated in any known manner, so as to be useful once again, for example in a water purification process.

The process according to the invention is preferably a closed and continuous system, which results in substantial water savings. Conventional processes rely on moderate to large quantities of external water to perform one or more of the transferring, cleaning, backwash, or separating functions during resin processing. Particularly, in a preferred process according to the invention, water is reused throughout the process, hence no external water is needed. That means that no water is consumed during the resin processing, and there is no discharge of waste water, i.e., there is substantially 100% water recovery. Specifically, water used to transport the resins to and from the cleaner is recirculated for reuse instead of a once through disposal design which generates waste water potentially containing radioactive waste. Such radioactive waste requires subsequent processing at additional cost before disposal. Similarly, the water used in the cleaning process, the classifier and the separator is recycled, hence reducing the amount of water required, and the amount of waste produced.

The water may be recycled throughout the process in any desirable manner. A preferred method is shown in FIG. 1.

Conventional resin processing systems contribute to a total use of about 300 gallons of water per cubic foot of resin to be processed. The use of a closed system according to the present invention can reduce the total use by about 50%. Hence, substantial water is saved, resulting in the production of less waste water, and resulting in lower water and waste disposal costs.

The separation process and apparatus of the present invention, with or without the cleaning and classification apparatuses, can be used to segregate radioactive materials from non-radioactive materials. Specifically, a mixture of ionic exchange resins which have been used at a nuclear plant typically contains resin material which is not as radioactive and resin material which is more radioactive. Specifically, at nuclear power stations, resins are used to process water and various process streams containing or potentially containing varying degrees of radioactivity. Typically the radioactivity is ionic in form which allows removal by ion exchange resins. The boiling water reactor (BWR) power station design could have a condensate stream containing radioactive iodine in the anionic form. A pressurized water reactor (PWR) power station design could have radioactive cesium or cobalt in the cationic form. In either case, one or more ionic species can be exchanged by available sites on the resin beads. When the less radioactive material is separated from the more radioactive material, with the use of the instant separator, there is a substantial savings in disposal of the resins, since only the more radioactive material needs to be disposed of as radioactive waste (alternatively, the radioactive waste can be further processed to remove radiation), and the less radioactive material can be disposed of, in a typical landfill or reused. Conventionally, it has been the practice in industry not to separate the more radioactive from the less radioactive resin, but to dispose of all of the mixture as radioactive waste. Such a technique clearly results in increased disposal costs, as compared to the novel technique described above.

The separation apparatus, and/or the cleaning apparatus and/or the classifying apparatus, of the present invention can be used to qualify new resins, that is, to process new resins before they have been used. New resins are desirably cleaned and/or classified (if the resin comprises a mixture of particle sizes), since in the manufacturing of the resins there is unavoidably present undesired contaminants such as organic carbon, fines, and small beads (generally less than 100 microns) which are desirably removed prior to the use of the resins. Hence, it is preferred to use a cleaning step such as described above to clean a mixture of ion exchange resins, prior to using the resins to purify water.

The apparatus of the present invention can also be designed so as to be mobile to facilitate moving the apparatus from facility to facility. Such a mobile design allows use of the separating apparatus, optionally in combination with the cleaning and/or classifying apparatus, at temporary locations, such as nuclear facilities, without the large capital expenditures required to permanently install the system. A mobile resin processing system is configured to suit the space confines of the transportation vehicle. Height, length, width, and weight values are considered along with connections for support utilities such as air, water, and power. One or more mobile units are used as required by the quantity of the system components.

While the invention has been described in connection with specific embodiments thereof, it is to be understood that variations and modifications can be effected within the spirit and scope of the invention.

What is claimed is:

1. A method of separating a mixture of resins, comprising a first and second type of resins which have different settling velocities, from each other comprising the steps of:
   a) introducing said mixture of resins at an entry height into a separator column having an upper and lower region wherein both regions have an outlet and between these outlets is a separation zone;
   b) flowing a carrier fluid upwardly through said column at a velocity less than the settling velocity of the first type of resins and greater than the settling velocity of the second type of resins, wherein said carrier fluid is introduced into said separator column as a fluid having a laminar or essentially laminar flow, and wherein the carrier fluid maintains this laminar or essentially laminar flow through the separation zone of said separator column; and
   c) removing said second type of resins from said upper region and removing said first type of resins from said lower region.

2. A method of claim 1, wherein said mixture of resins comprise a mixture of ion exchange resins, said first type of resins comprise cation resins and said second type of resins comprise anion resins, and wherein said cation resins fall downwardly in said column and said anion resins are carried upwardly in said column by said carrier fluid.

3. A method of claim wherein said separator column does not contain baffles, orifices, or flanges which create turbulence and dead-zones in said column, and serve to destroy said laminar flow.

4. A method of claim 1 wherein said laminar or essentially laminar flow is produced by minimizing said carrier fluid velocities and allowing natural fluid expansion of said carrier fluid from an inlet pipe into said separator column.

5. A method of claim 4 wherein said laminar or essentially laminar flow is generated using a low head centrifugal pump of moderate flow capacity and having a discharge pipe velocity of less than about 2.0 feet per second and then expanding the laminar flow from the pump using a concentric reducing section or other conventional distribution means to accommodate the desired process chamber cross sectional area.

6. A method of claim 2 wherein said carrier fluid comprises water.

7. A method of claim 6 wherein said carrier fluid further comprises a chemical additive to accent density differences between the cation and anion resins with the resultant effect being improved material separation.

8. A method of claim 6 wherein the method is a continuous process comprising a continuous feed of said carrier fluid and of said resin mixture, wherein the separated anionic and cationic resins are continuously removed from the tank and wherein no external water is used during the process.

9. A method of claim 1 wherein said mixture of resins before introduction into said separator, is pre-treated in a cleaning module, so as to remove coatings from the resins, and to remove from the resin mixture impurities and resins having a size below a predetermined size.

10. A method of claim 9, wherein said pretreatment in said cleaning module comprises spraying pressurized water onto the resin mixture so as to remove resin coatings, and screening the resins so as to separate the resins from impurities and resins having a size below said predetermined size.

11. A method of claim 10 wherein said pretreatment in said cleaning module comprises using centrifugal force to force the resin across a vibrating screen assembly which removes small particulates of the resin mixture, and wherein said pressurized water is provided by pressurized rotating sprayers located above said vibrating screen assembly.

12. A method of claim 10 which further comprises prior to introduction of the resins into the separator, and after introduction of the resins into the cleaning module, classifying the resins by fluidizing the resins with water, allowing the fluidized resins to settle, and extracting predetermined segments of the resins so as to obtain a mixture which separates more efficiently in the separator.

13. A method of claim 12, wherein said carrier fluid after passing through the separator is recycled to the separator; wherein the water sprayed in the cleaner is continuously recycled either to the cleaner or to a tank which feeds the cleaning module; and wherein the water used to fluidize in the classifier is recycled to the classifier.

14. A method of claim 9, wherein said mixture of resins comprise resins which have not been used before in a fluid treatment process, wherein the process serves to precondition the new resins prior to use.

15. A method as claimed in claim 9, wherein the resins are cleaned and used a multiple of times, before being introduced into the separator.

16. A method of claim 1 wherein either said first or said second type of resins are more radioactive than the other, and wherein after the resins are removed from the separator column, the more radioactive type of resins is disposed of as radioactive waste, or further processed to remove the radioactivity.

17. A method of cleaning a mixture of ion-exchange resins which comprises the steps of subjecting the resins to pressurized rotating water spraying; and using centrifugal force to force the resin mixture across a screen which serves to sieve out undesired impurities and smaller resins and fines of a size smaller than the size of the smallest resin particles desired to be retained.

18. A method of claim 17, wherein only one screen is used in the process and this screen is a vibrating screen which serves to sieve out said undesired impurities, said smaller resins and said fines.

19. A method of claim 18, wherein the vibrating screen does not rotate.

20. A method of claim 17, wherein the method is a continuous one with the water sprayed from the sprayers, being recirculated to the process for spraying onto additional resins introduced into the cleaning process.

21. A method of claim 17, wherein the resin mixture is forced across a vibrating screen.

* * * * *